UNITED STATES PATENT OFFICE.

GILES LANGDELL AND MARCUS A. ROOT, OF PHILADELPHIA, PA.

MODE OF TINTING PHOTOGRAPHIC PICTURES.

Specification forming part of Letters Patent No. 15,311, dated July 15, 1856.

*To all whom it may concern:*

Be it known that we, GILES LANGDELL and MARCUS A. ROOT, of Philadelphia, in the State of Pennsylvania, have invented a new and improved mode of coloring daguerreotype and other photographic portraits or pictures made on glass, metal, or other material; and we do hereby declare that the following is a full and exact description.

The nature of our invention or discovery consists in providing and applying both mineral and vegetable coloring-matters in solution to the daguerreotype or any other photographic impression, introducing the said coloring-matters either into the collodion or the developer, or by pouring upon the plate after the impression is "fixed," by hyposulphite of soda or the cyanide of potassium, or by any other means.

The several coloring substances—*e. g.*, red saunders, alkanet, dragon's blood, &c.—can be used separately or in conjunction or compounded with various mineral substances, or with any coloring-matters obtained from other roots, woods, gums, or other vegetable matter, the proportion or quantity employed being varied or regulated by the lightness or depth and strength of tone which may from time to time be required.

The desired or similar results may be obtained from different formulæ. The following answers for all practical purposes, but may be varied at pleasure:

Digest for two or three days red saunders, (*Pterocarpus santalinus,*) half a pound in three pints of water, to which aqua-ammonia has been added. Then pour off the solution and precipitate by the addition of nitric acid. Wash the precipitate thoroughly with water and dry it. Then dissolve it in strong alcohol and dilute with the same as required to produce the tone or tint that may be desired. Alkanet (*Anchusa tinctoria*) may be prepared in the same way. Dragon's blood dissolved in alcohol and treated in the same manner will produce the various shades of yellow.

The foregoing articles, and also madder, indigo, cochineal, and some other coloring substances, both vegetable and mineral, alone or combined, will produce pleasing results when applied as follows, (although they may be introduced into the collodion:) We prefer first to develop the impression, then to fix and dry it, and afterward to flow on the toning or tinting solution, as collodion or varnish, &c., is poured upon the plate, allowing the solution to run off the corner, and then leveling the plate to make the fluid flow uniformly over and tint the whole surface of the plate evenly. Then wash at once and thoroughly with clean water and stand the plate up to dry, after which it may be colored (the dress of any tint or color desired—the face, hands, &c., a flesh tint) with dry colors (as is usual in coloring daguerreotypes) applied to the collodion or upon the varnish.

What we claim as our invention and discovery, and desire to secure by Letters Patent, is—

The application of coloring substances or matter to photographic impressions or pictures upon glass or metal or other material, in the form and manner herein described.

GILES LANGDELL. [L. S.]
M. A. ROOT. [L. S.]

Witnesses:
JAMES J. B. OGLE,
WILLIAM OGLE.